United States Patent
Ohn (10) Patent No.: US 8,145,423 B2
(45) Date of Patent: Mar. 27, 2012

(54) NAVIGATON DEVICE AND ROUTE GUIDING METHOD THEREFOR

(75) Inventor: Seung-hoon Ohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1180 days.

(21) Appl. No.: 11/934,268

(22) Filed: Nov. 2, 2007

(65) Prior Publication Data

US 2008/0147317 A1    Jun. 19, 2008

(30) Foreign Application Priority Data

Dec. 19, 2006   (KR) .................. 10-2006-0129850

(51) Int. Cl.
*G01C 21/00* (2006.01)

(52) U.S. Cl. .... 701/409; 701/410; 701/455; 340/995.11

(58) Field of Classification Search ............... 701/202, 701/207, 200, 208, 209, 212; 340/990, 995.1, 340/995.11–995.28
See application file for complete search history.

(56) References Cited

U.S. PATENT DOCUMENTS

| 7,376,510 B1* | 5/2008 | Green ................... 701/209 |
| 2004/0070620 A1* | 4/2004 | Fujisawa ................ 345/764 |

* cited by examiner

*Primary Examiner* — Gertrude Arthur Jeanglaude
(74) *Attorney, Agent, or Firm* — Jefferson IP Law, LLP (57) ABSTRACT

A navigation device and a route guiding method. The route guiding method includes: displaying a current map including a position indicator; displaying a related map that corresponds to the current map; and displaying the current map after a set period of time has elapsed. The set time period can be set by a user. Therefore, the travel simulation of the route from the current position to the a location desired by a user may be displayed, or the route may be zoomed in or out to be displayed, based on settings input by a user, and thus the user can travel safely.

20 Claims, 6 Drawing Sheets

NAVIGATON DEVICE AND ROUTE GUIDING METHOD THEREFOR

CROSS-REFERENCE TO RELATED APPLICATIONS

This application claims the benefit of Korean Application No. 2006-129850, filed Dec. 19, 2006, in the Korean Intellectual Property Office, the disclosure of which is incorporated herein by reference.

BACKGROUND OF THE INVENTION

1. Field of the Invention

Aspects of the present invention relate to a navigation device and a route guiding method therefor.

2. Description of the Related Art

Generally, navigation devices detect the position of a vehicle, to display travel trace lines on an electronic map. An electronic map can show the position the vehicle, based on geographic information, or the like, which are recorded in a recording medium.

Additionally, if a user designates a departure point and a destination, a navigation device may search for a travel route from the departure point to the destination, and display the route on the electronic map. Accordingly, the user may easily confirm the route. Such a navigation device receives satellite signals from a Global Positioning System (GPS) and recognizes the current position and direction of movement of the vehicle, to track the travel route. Therefore, it is possible to reach the destination from the departure point through various travel routes, and there is a need to be able to provide a driver with the shortest and/or best travel route.

However, a conventional navigation device provides a travel simulation once before departure, when searching for the entire route from the departure point to the destination. Accordingly, if a user desires to know the route from a current position to the destination while traveling, partial routes may be provided multiple times. Therefore, the user may need to manipulate the navigation device multiple times to search for the route, from the current position to the destination, while traveling, which increases the risk of an accident occurring, and causes inconvenience to the user.

SUMMARY OF THE INVENTION

Aspects of the present invention relate to a navigation device and a route guiding method therefor, that provide operations corresponding to settings input by a user, and which may be displayed on an electronic map through simple manipulation.

Additional aspects and/or advantages of the invention will be set forth in part in the description which follows and, in part, will be obvious from the description, or may be learned by practice of the invention.

According to an aspect of the present invention, there is provided a route guiding method including: displaying a related map which is connected to a position being displayed on a current map; and displaying the current map after a predetermined period of time has elapsed.

According to another aspect of the invention, the related map is a screen in which operations corresponding to settings input by a user are displayed on a previously stored electronic map.

According to another aspect of the invention, the settings include one or more of: information relating to the type of operations to be displayed on the related map; information relating to the range of the electronic map to be displayed on the related map; and information relating to the predetermined period of time.

According to another aspect of the invention, the operations include one or more of, a travel simulation operation and a zoom out operation. The displaying the related map includes displaying a related map corresponding to one of, the travel simulation operation and the zoom out operation.

According to another aspect of the invention, the information relating to the range of the electronic map includes one or more of; information relating to a destination and information relating to a turn.

According to another aspect of the invention, the related map may be displayed, if a user presses a specific key.

According to another aspect of the invention, the current map includes information relating to the current position.

According to another aspect of the present invention, there is provided a navigation device comprising: a manipulator to output a key signal corresponding to a received specific command; and a controller to display a related map, which is connected to a position being displayed on a current map.

According to another aspect of the present invention, the related map is a screen in which operations, corresponding to settings input by a user, are displayed on a previously stored electronic map.

According to another aspect of the present invention, the settings include one or more of; information relating to the type of operations to be displayed on the related map, information relating to the range of the electronic map to be displayed on the related map, and information relating to the predetermined period of time.

According to another aspect of the present invention, the operations include one or more of; a travel simulation operation and a zoom out operation, and the controller displays the related map corresponding to one of, the travel simulation operation and the zoom out operation.

According to another aspect of the present invention, the information relating to the range of the electronic map may comprise one or more of; information on a destination and information on a turn.

According to another aspect of the present invention, the related map may be displayed, if a user presses a specific key.

According to another aspect of the present invention, the current map includes information relating to a current position.

According to another aspect of the present invention, the specific command is a quick view command corresponding to the specific key pressed by the user.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below, in order to explain the present invention by referring to the figures.

Figure 1:
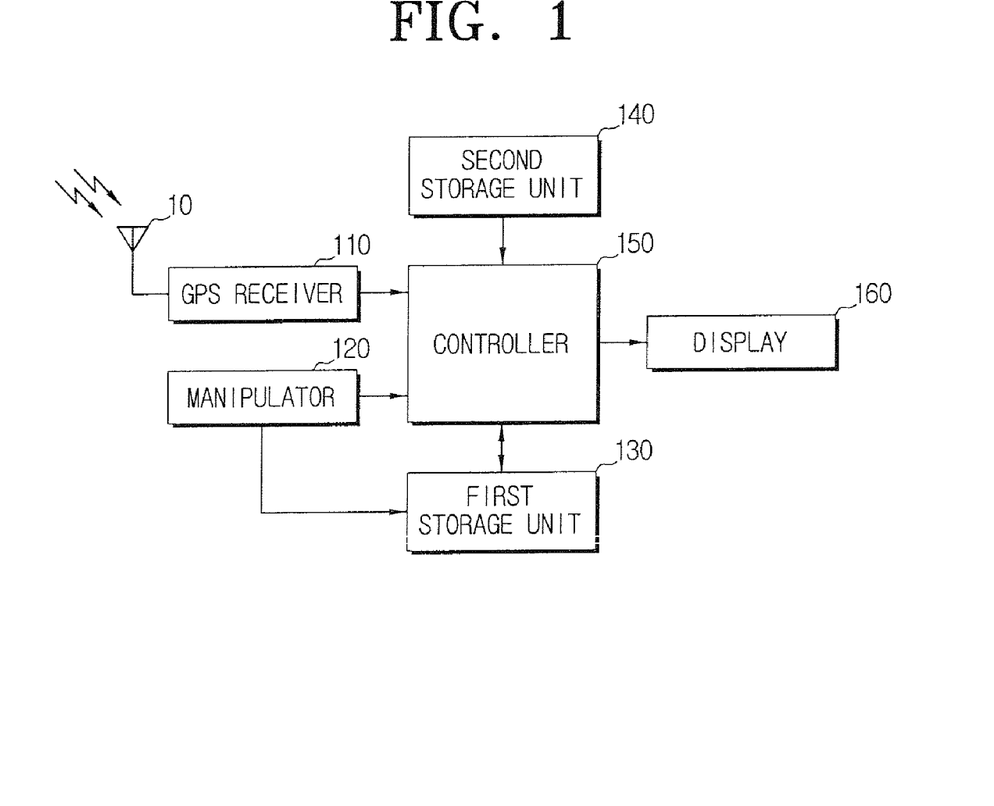
FIG. 1 is a block diagram of a navigation device, according to an exemplary embodiment of the present invention.

FIG. 1 is a block diagram of a navigation device 100, according to an exemplary embodiment of the present invention. As shown in FIG. 1, the navigation device 100 may comprise a Global Positioning System (GPS) receiver 110, a manipulator 120, a first storage unit 130, a second storage unit 140, a controller 150, and a display 160. In some embodiments, the display 160 and the manipulator can be the same component.

The GPS receiver 110 outputs position information, obtained by computing the position of the navigation device 100, based on a GPS signal received through a GPS antenna 10. The GPS receiver 110 amplifies the received GPS signal to output an amplified signal. Specifically the GPS receiver 110 computes the position of the navigation device 100, using the difference between the time of transmission of the GPS signal from the satellite and the time of reception of the GPS signal by the navigation device 100, based on a satellite number and time information contained in the GPS signal, received through the GPS antenna 10.

The manipulator 120 can include keys, buttons, a touch screen, or the like, and receives information, relating to a departure point and a destination, from a user. The manipulator 120 receives settings input by a user, and stores the settings in the first storage unit 130. The settings can comprise quick view settings comprising settings relating to a display area, an operation displayed, and a display period. The quick view settings can cause the controller 150 to produce a related map that corresponds to a current map. The current map can be a map that displays the travel route, or a portion thereof. The related map can be a modified version of the current map, an enlarged portion of the current map, or a map encompassing the current map. A user can select one or more of a plurality of quick view settings, to produce a related map, as discussed below.

The display area settings can comprise operations to produce a related map having a different scale (encompassing a different size area) than the current map. For example, a travel simulation operation to produce a related map that displays an entire travel route, a zoom in operation to produce a related map that displays an enlarged portion of the current map, and a zoom out operation to produce a related map encompassing an area greater than the area displayed in the current map. In this way, the display area operations can be used to produce a related map related to a current map.

The operation displayed can comprise operations to produce a related map comprising additional and/or different information than that which is displayed on a current map. For example, the additional information can be a distance to a particular location, a scale, a next turn on a travel route, and a destination. In this way, the operations displayed can be used to produce a related map corresponding to a current map, but having additional features.

The display periods can comprise time periods during which a related map is shown. The display periods can be, for example, 3 seconds, 5 seconds, 10 seconds, a user-determined interval, or a period lasting until a destination is reached.

Figure 2A:
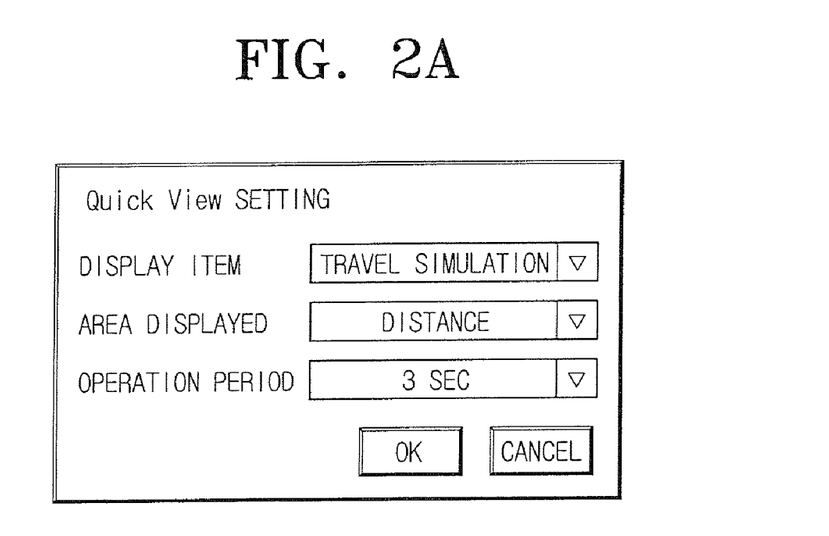
FIGS. 2A to 2B are exemplary views illustrating settings provided in a navigation device, according to an exemplary embodiment of the present invention.
Figure 2B:
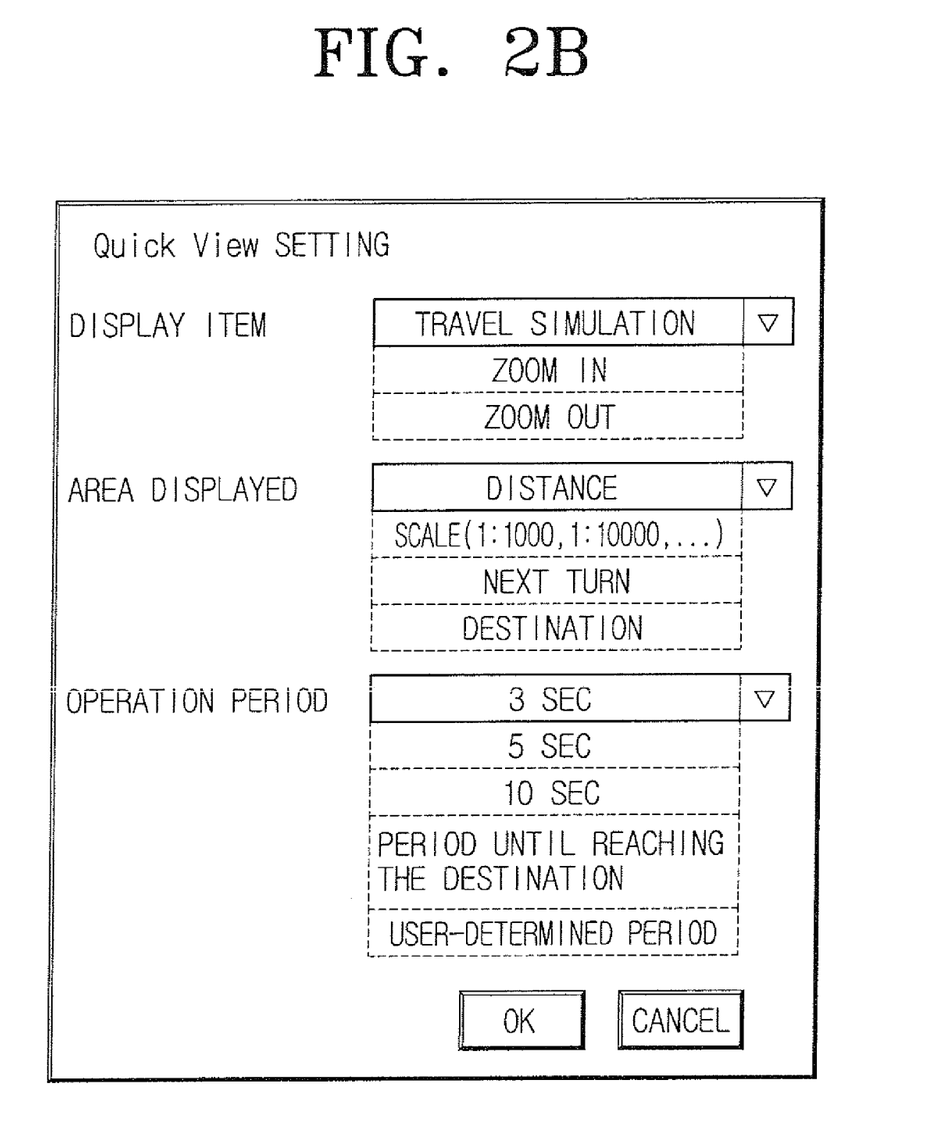

As shown in FIG. 2A, the settings can be displayed in a display window 200. The display window 200 can be displayed on the display 160. The display window 200 can comprise a display area field 202, to display a selected display area. The display window can comprise an operation displayed field 204, to display a selected operation to be displayed. The display window can comprise a display period field 206, to display a selected display period. The display window can comprise an OK field 208 and a CANCEL field 210, to allow a user to further manipulate the selections made in the display window. As shown in FIG. 2B, the display area field 202, the operation displayed field 204, and the display period field 206 can be drop-down menu fields that allow a user to select from various settings.

When the travel simulation operation is selected in the display area field 202, the map displayed may further include a scale. If the user-determined interval is selected as the display period, required for displaying the item set in the display area field, a user may set the display period. The display areas indicate information relating to the type of operations to be displayed on the related map, and the operation displayed relates to information on the range of the electronic map to be displayed on the related map.

The manipulator 120 can be used by a user to input a display area selection and an operation displayed selection. The manipulator 120 outputs a display area key signal and an operation displayed key signal, corresponding to the received selections.

In some embodiments the navigation device 100 can comprise one or more hot keys. Hot keys can be assigned one or more settings, and can trigger key signals, relating to the one or more settings, to be sent to the controller 150. If the user inputs a hot key, corresponding to, for example, the travel simulation operation, the manipulator 120 may output a key signal corresponding to the travel simulation operation. In another example, the hot key can correspond to the zoom in operation and the next turn operation, and can output key signals, corresponding to both operations, to the controller 150.

The first storage unit 130 stores various programs used to operate the navigation device 100, and stores the settings received through the manipulator 120. The second storage unit 140 stores map data, that is, the electronic map including map information. It is within the scope of the present teachings to have a single storage unit that performs the storage functions of both of the first storage unit 130 and the second storage unit 140.

The controller 150 computes the velocity of the navigation device 100, based on the position information output from the GPS receiver 110. The controller 150 computes the current velocity of the navigation device 100 using previous position information and current position information, which are sequentially output from the GPS receiver 110. Methods for computing the velocity of the navigation device 100 are known to those skilled in the art, so a more detailed description thereof is omitted.

Additionally, the controller 150 searches for a route, from a departure point to a destination, based on information received from the manipulator 120. If the travel simulation key signal is received from the manipulator 120, the controller 150 may control the display 160 to display a related map comprising a travel simulation of the searched route, from the departure point to the destination. The related map can be read out from the second storage unit 140. If the travel simulation is terminated, the controller 150 may display a current map to guide a user along a route by showing, for example, the remaining distance from the current position of the navigation device 100 to the destination, the expected time of arrival, the distance to the next turn, and turning directions (whether to turn left or right) at the next turn. Methods for searching for the route are known to those skilled in the art, so a more detailed description thereof is omitted.

If a hot key signal is received from the manipulator 120, the controller 150 may control the display 160 to display a related map corresponding to a current map that is modified by the quick view settings associated with the hot key. The associated settings can be stored in and read from the first storage unit 130. In other words, if the quick view key signal is received, the controller 150 may cause the display 160 to display a related map, connected to the position of the navigation device 100 being displayed on the current map, based on the settings.

Figure 3:
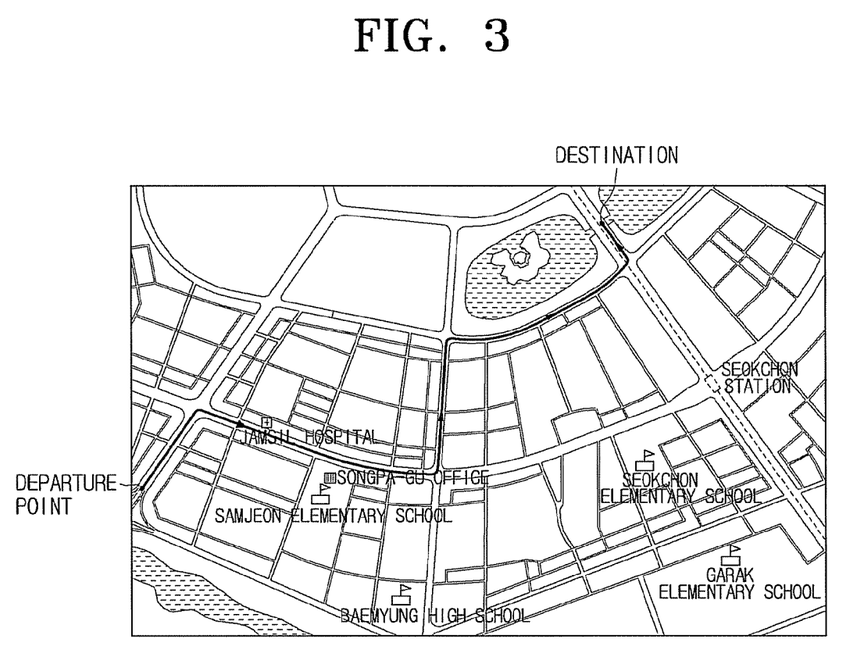
FIG. 3 is an exemplary view illustrating a current map and a related map, when a travel simulation is selected in a display area field.

Specifically, referring to FIG. 3, if the travel simulation operation is selected, in the display area field included in the settings, the controller 150 may control the display 160, such that a travel simulation, of a route from the current position of the navigation device 100 to a selected destination, can be displayed in the related map, for the display period.

Figure 4A:
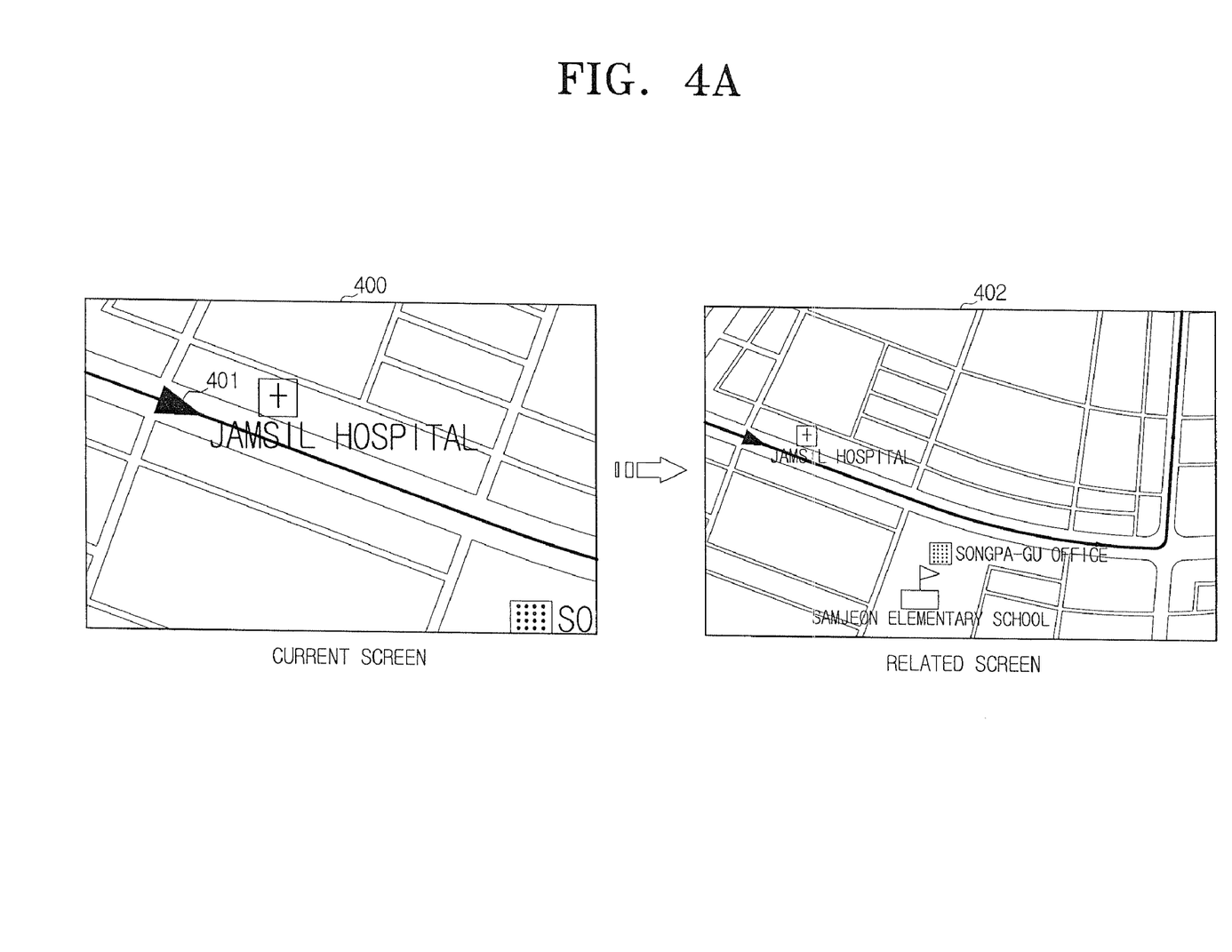
FIG. 4A is an exemplary view illustrating a current map and a related map, when a zoom out operation is selected in a display area field and a next turn is selected in an operation displayed.
Figure 4B:
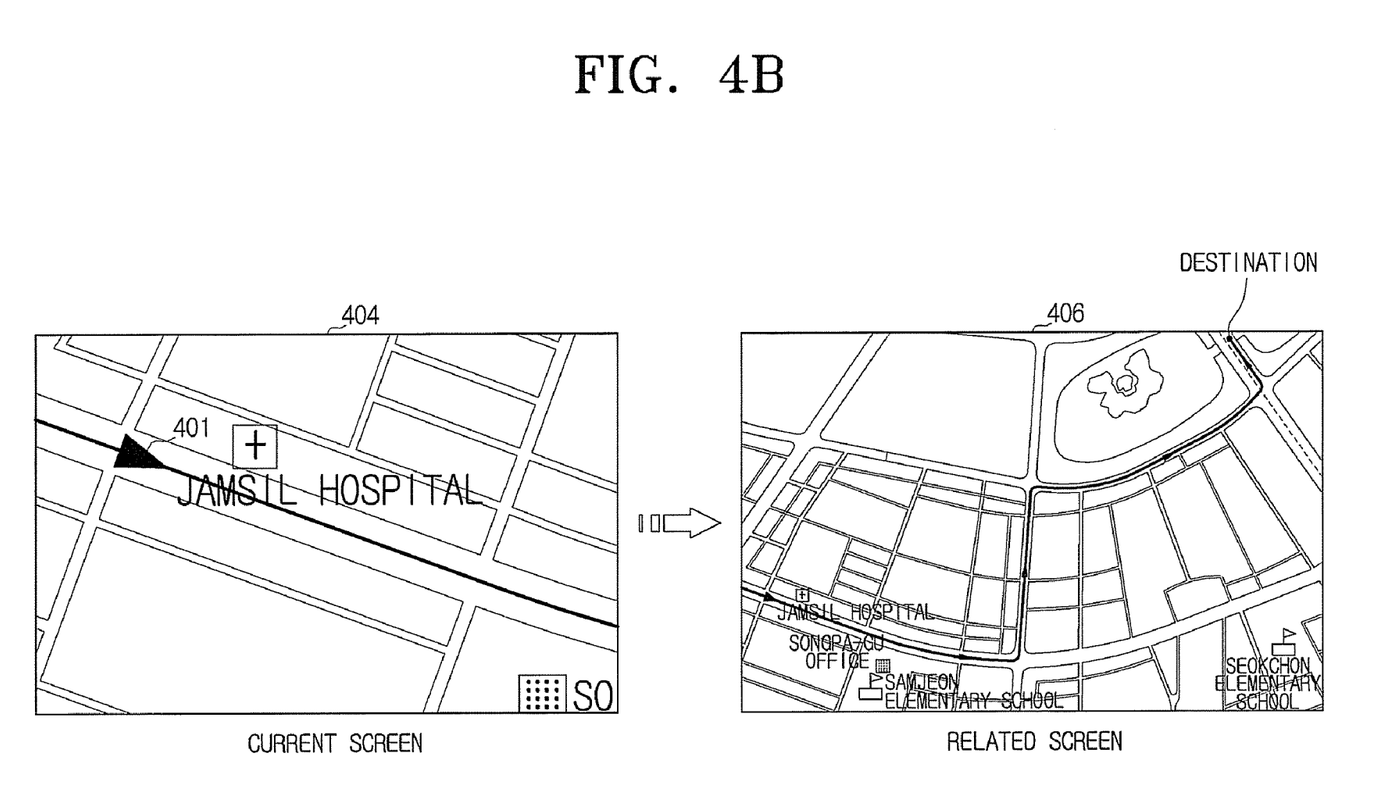
FIG. 4B is an exemplary view illustrating a current map and a related map, when a zoom out operation is selected in a display area field and a destination is selected in an operation displayed.

In FIG. 4A, a current map 400 and a related map 402 are depicted. In FIG. 4B, a current map 404 and a related map 406 are depicted. The current maps 400 and 404 and the related maps 402 and 406 comprise a position indicator 401. The position indicator 401 indicates the current position of the navigation device 100. The current map 400 and the related map 402 can be referred to as corresponding with one another because they both comprise the position indicator 401. Similarly current map 404 and the related map 406 can be referred to as corresponding with one another. A related map can be referred to as a modified version of a current map, in that the related map can encompass a different area around the position indicator and/or can comprise additional and/or different information relating to a travel route.

Referring to FIGS. 4A and 4B, if the zoom out operation is selected, in the display area field, the controller 150 may control the display 160 switch from the current map showing, for example, a route from a current position of the navigation device 100, to a related map for the display period. The related map can be a zoomed out view of the current map. In other words, the controller 150 controls the display 160 so that the route, from the current position of the navigation device 100 to the operation displayed set by the user, such as, the next turn or the destination, can be displayed in detail for the display period. If the distance or the scale is selected in the operation displayed field, the distance and scale may be selected from preset options shipped with a navigation device, or may be set by the user.

The controller 150 measures the time during which a related map is displayed. If the measured time exceeds the set display period, the controller 150 may control the display 160, so that the operations, corresponding to the settings displayed on the electronic map, can be terminated, and the current map is thereby displayed If the operations corresponding to the settings are terminated, the controller 150 may continuously guide the route, from the current position of the navigation device 100, to the destination.

If the zoom in operation is selected, in the display area field, the controller 150 may cause the display 160 to show a zoomed in related map, to display a route, from the current position of the navigation device 100 to the operation displayed, for the display period, in the same manner as for selecting the zoom out.

Figure 5:
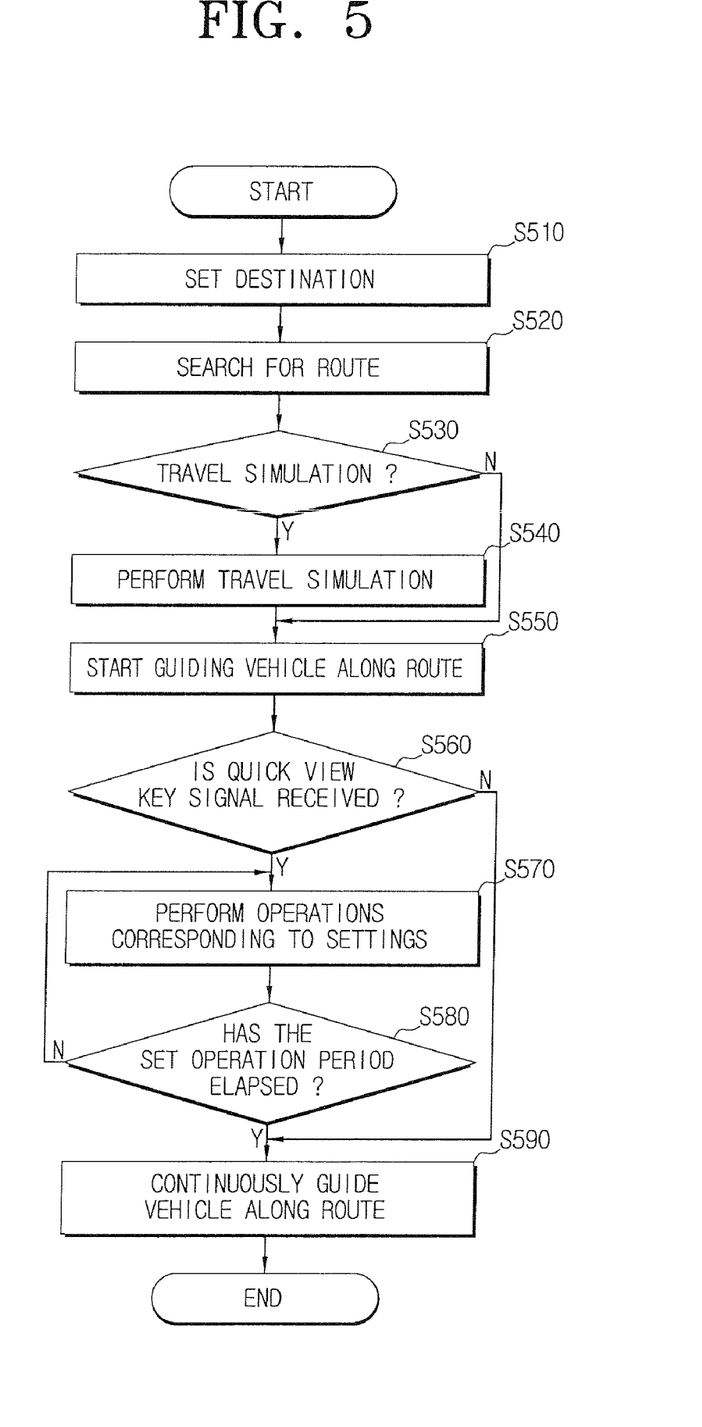
FIG. 5 is a flowchart explaining an operation method of a navigation device, according to an exemplary embodiment of the present invention.

FIG. 5 is a flowchart explaining operations of a method of a navigation device, according to an exemplary embodiment of the present invention. In operation S510, a user inputs a departure point and a destination, through the manipulator 120. In operation S520, the controller 150 searches for a travel route from the departure point to the destination. The controller 150 may search for an optimal travel route from the departure point to the destination, but the function of the controller 150 is not necessarily limited thereto. For example, travel routes can be selected base on distance, travel time, traffic, sites of interest, or the like.

In operation S530, the controller 150 detects whether a travel simulation key signal, is received from the manipulator 120. If a travel simulation key signal is received, the method proceeds to operation S540. If a travel simulation selection command is not received, the method proceeds to operation S550.

In operation S540 the controller 150 displays a travel simulation of the travel route from operation S520. The travel simulation may include a highlighted path, from the departure point to the destination, on the electronic map. For example, if a user inputs a travel simulation selection command, the manipulator 120 outputs a travel simulation key signal, corresponding to the input travel simulation selection command, to the controller 150. The controller 150 searches for a travel route from the departure point to the destination. The controller causes the display 160 to display a travel simulation of the travel route found by the search, on an electronic map. The electronic map can be read out from the second storage unit 140. Methods for searching for a route are known to those skilled in the art, so a more detailed description thereof is omitted.

If the travel simulation is terminated, or if a travel simulation is not received, the method can proceed to operation S550. In operation S550, the controller 150 may start guiding a user along the travel route. For example, the controller 150 may show the remaining distance from a current position, of the navigation device 100, to the destination, the expected time of arrival, the distance to a next turn, and/or whether to turn left or right at the next turn. If the travel simulation key signal is not received in operation S530, the controller 150 may start guiding the user to the destination, along the route determined in operation S520.

In operation S560, the controller 150 detects whether a quick view setting has been input by a user. If a quick view key signal is not input, the method proceeds to operation S590, and the controller 150 may continuously guide the vehicle along the route from the current position of the navigation device 100 to a destination.

If a quick view setting is detected the method proceeds to operation S570. In operation S570, if a user has input one or more quick view settings, the controller 150 may display a related map corresponding to the operations of the quick view settings. The input quick view settings may comprise display areas, an operation displayed, and display periods. The display areas can comprise travel simulation, zoom in, and/or zoom out operations, and information on the operation displayed can comprise the distance, the next turn, and/or the destination. The display periods can comprise intervals of 3 seconds, 5 seconds, 10 seconds, a user-determined interval, and/or a period until the user reaches the destination.

When the travel simulation operation is selected in the display area field, the operation displayed may include a scale. If the user-determined interval is selected, as the display period, a user may set the display period. For example, if the travel simulation operation is selected, in the display area field, the controller 150 may display a travel simulation of a route, from the current position of the navigation device 100 to the operation displayed, as shown in FIG. 3. The travel simulation route will be displayed for the display period. As a second example, if the zoom out operation is selected, in the display area field, and the next turn operation is selected, the controller 150 may zoom out to display a route from the current position of the navigation device 100, to the next turn on the previously stored electronic map, as shown in FIGS. 4A and 4B. The route will be displayed for the display period. If the zoom out operation is selected in the display area field and the destination is selected in the operation displayed field, the controller 150 may zoom out, to display a route from the current position of the navigation device 100 to the destination on the previously stored electronic map, for the display period. If the zoom in operation is selected in the display area field, the controller 150 may zoom in, to display the route from the current position of the navigation device 100 to the operation displayed, for the display period, in the same manner as for selecting the zoom out.

In operation S580, if the display time, during which the operations are displayed on the electronic map, exceeds a display period, the controller 150 may stop displaying the operations on the electronic map. If the display time is less than the display period, the controller 150 displays the operations, corresponding to the settings on the electronic map, until the display time reaches the display period. In operation S590, the controller 150 guides a user along the travel route, from the current position of the navigation device 100, to the destination.

In the navigation device and route guiding method, according to various embodiments of the present invention, a method for computing the position of the navigation device 100, using the time information contained in the GPS signal, is explained as an example for the convenience of description. However, other methods for computing the position of the navigation device 100, based on the GPS signal, may be also applied.

Additionally, in the navigation device and route guiding method according to the exemplary embodiments of the present invention, the operations corresponding to the settings are performed using hot keys as described above. However, the present invention is not necessarily limited thereto, and the operations may be performed using shortcut icons.

Furthermore, although the related map for displaying the set area is displayed on the currently displayed screen in the exemplary embodiments of the present invention, other related maps may be displayed.

As described above, according to aspects of the present invention, the travel simulation of the route from the current position to the operation displayed desired by a user may be displayed, or the route may be zoomed in or out to be displayed, based on the settings input by the user. Therefore, a user can travel safely.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A route guiding method for a navigation device, comprising:
    displaying a current map comprising an indicator of a current position;
    displaying a related map comprising the current position for a preset display period, the related map comprising a same perspective as the current map and a different mapped area than the current map; and
    displaying the current map after the display period has elapsed.

2. The method as claimed in claim 1,
    wherein the related map is created based on settings input by a user, and
    wherein the display period is set by the user.

3. The method as claimed in claim 2, wherein the settings comprise one or more of:
    a display area operation to set a range of the related map;
    a displayed operation to produce information to be displayed on the related map; and
    a display period operation to set the display period of the related map.

4. The method as claimed in claim 3,
    wherein the display area operation comprises one of a travel simulation operation to display a travel route from the current position to a destination and a zoom out operation to enlarge the range of the related map with respect to the range of the current map, and
    the displaying of the related map comprises displaying the related map in accordance with the display operation.

5. The method as claimed in claim 3, wherein the displayed operation comprises one of an operation to display the mapped area of the related map determined substantially in accordance with the current position and a destination and an operation to display the mapped area of the related map determined substantially in accordance with the current position and a turn on a travel route.

6. The method as claimed in claim 1, wherein the displaying of the related map further comprises displaying the related map in response to a user input of the navigation device.

7. The method as claimed in claim 1,
    wherein the current map comprises a mapped area substantially determined in accordance with the current position and a predetermined range, and
    the related map comprises one of a mapped area substantially determined in accordance with the current position and a destination, a mapped area substantially determined in accordance with the current position and a turn in a travel route, and a mapped area substantially determined in accordance with the current position and a second range different from the predetermined range.

8. A navigation device comprising:
    a display to display a current map comprising an indicator of a current position;
    a manipulator to receive one or more settings from a user; and
    a controller to produce a related map comprising the current position in accordance with the one or more settings and to control the display of the related map on the display, for a set display period
    wherein the related map comprises a same perspective as the current map and a different mapped area than the current map.

9. The device as claimed in claim 8, wherein the one or more settings comprise a display period operation to set the display period.

10. The device as claimed in claim 9, wherein the settings comprise one or more of:
   an display area operation to set a range of the related map;
   a displayed operation to produce information to be displayed in accordance with the related map; and
   a display period operation to set the display period of the related map.

11. The device as claimed in claim 10, wherein
   the display area operation comprises one of a travel simulation operation to display a travel route from the current position to a destination and a zoom out operation to enlarge the range of the related map with respect to the range of the current map, and
   the controller displays the related map corresponding to the area operation.

12. The device as claimed in claim 10, wherein the displayed operation comprises one of an operation to produce information in accordance with a destination and an operation to produce information on a turn on a travel route.

13. The device as claimed in claim 8, further comprising a user input unit to transmit a signal to the controller to display the related map.

14. The device as claimed in claim 8, further comprising a hot key to output two or more settings to the controller when selected by the user.

15. The device as claimed in claim 8,
   wherein the current map comprises a mapped area substantially determined in accordance with the current position and a predetermined range, and
   the related map comprises one of a mapped area substantially determined in accordance with the current position and a destination, a mapped area substantially determined in accordance with the current position and a turn in a travel route, and a mapped area substantially determined in accordance with the current position and a second range different from the predetermined range.

16. A route guiding method for a navigation device, comprising:
   displaying a current map comprising an indicator of a current position and a travel route;
   selecting one or more settings for a related map comprising the current position, the related map comprising a same perspective as the current map and a different mapped area than the current map;
   selecting a display period for the related map;
   displaying the related map, according to the selected setting, for the display period; and
   displaying the current map after the display period has elapsed.

17. The method of claim 16, wherein the selecting of the one or more settings comprises selecting one or more of:
   an area displayed operation to set a range of the related map; and
   an information displayed operation to produce information to be displayed in accordance with the related map.

18. The method of claim 17, wherein the selecting of the area displayed operation comprises selecting one of:
   a travel simulation operation to display a travel route from the current position to a destination;
   a zoom out operation to enlarge the range of the related map with respect to a range of the current map; and
   a zoom in operation to reduce the range of the related map with respect to the range of the current map.

19. The method of claim 17, wherein the selecting of the information displayed operation comprises selecting one of:
   an operation to produce information in accordance with a destination;
   an operation to produce information in accordance with a turn on a travel route; and
   an operation to produce a scale.

20. The method of claim 16, wherein the selecting of the display period comprises a user selecting one of:
   a predetermined time period; and
   a user determined time period.

* * * * *